(12) United States Patent
Okabe et al.

(10) Patent No.: US 8,241,191 B2
(45) Date of Patent: Aug. 14, 2012

(54) COMPOSITE WORKING LATHE

(75) Inventors: Naokazu Okabe, Aichi pref. (JP); Kenji Arisue, Aichi pref. (JP); Yasuhiro Goshima, Aichi pref. (JP); Minoru Kitayama, Aichi pref. (JP)

(73) Assignee: Yamazaki Mazak Corporation, Aichi pref. (JP)

( * ) Notice: Subject to any disclaimer, the term of this patent is extended or adjusted under 35 U.S.C. 154(b) by 541 days.

(21) Appl. No.: 12/207,738

(22) Filed: Sep. 10, 2008

(65) Prior Publication Data

US 2009/0075795 A1   Mar. 19, 2009

(30) Foreign Application Priority Data

Sep. 14, 2007 (JP) ................. P2007-239696

(51) Int. Cl.
*B23Q 3/157* (2006.01)
*B23Q 11/08* (2006.01)
(52) U.S. Cl. .......... 483/3; 483/18; 483/68; 483/69; 29/27 R; 74/609
(58) Field of Classification Search ........... 29/27 C, 29/27 R, 33 J, 56.5; 409/165, 201, 216, 19, 409/38, 134; 82/157, 158, 900, 901, 173; 483/15, 18, 3, 68, 2, 17, 69; 74/608, 609, 74/612, 617
See application file for complete search history.

(56) References Cited

U.S. PATENT DOCUMENTS

| | | | |
|---|---|---|---|
| 5,434,457 A * | 7/1995 | Josephs et al. | 307/326 |
| 6,077,206 A | 6/2000 | Azema | |
| 6,082,573 A * | 7/2000 | Hofman et al. | 220/480 |
| 6,364,582 B1 | 4/2002 | Hoppe et al. | 409/134 |

(Continued)

FOREIGN PATENT DOCUMENTS

CN    1275467 A    12/2000

(Continued)

OTHER PUBLICATIONS

McQuate, M. WFL Millturn Offers Newest Machines Industrial Product News[online], Oct. 2005 [retrieved on May 12, 2006]. Retrieved from the Internet:< URL: http://www.ipnews.com/archives/metalcutting/oct05/wfl_millturn.htm>.*

(Continued)

*Primary Examiner* — Erica E Cadugan

(74) *Attorney, Agent, or Firm* — Renner, Otto, Boisselle & Sklar, LLP

(57) ABSTRACT

The present invention aims at improving the efficiency of tool management by improving the arrangement of a tool magazine in a composite working lathe. The composite working lathe 1 includes a spindle stock and a tool spindle disposed on a bed 20, and a cover 2 covering the surrounding area thereof. A door 4 allowing access to a machining portion is provided on a front side F of the machine, and the machining portion can be visually observed through a window 5. A tool magazine unit 100 is disposed in front of the spindle stock of the machine. A door 120 and a window 130 are provided on the cover of the tool magazine unit 100, allowing operators to observe the tool stored in the magazine through windows 122 and 130. The present composite working lathe enables to improve the efficiency of tool management, such as the confirmation of the tool used in the subsequent step or the removal of chips on the used tool.

6 Claims, 7 Drawing Sheets

U.S. PATENT DOCUMENTS

| | | | |
|---|---|---|---|
| 6,761,515 B2 * | 7/2004 | Laur et al. | 409/132 |
| 2003/0115736 A1 | 6/2003 | Kurz et al. | |
| 2006/0189464 A1 | 8/2006 | Corbean et al. | 483/63 |
| 2006/0270538 A1 | 11/2006 | Komizo | |

FOREIGN PATENT DOCUMENTS

| | | |
|---|---|---|
| CN | 2644056 Y | 9/2004 |
| CN | 1774315 A | 5/2006 |
| DE | 31 43 409 | 5/1983 |
| DE | 197 17 255 | 10/1998 |
| DE | 19717255 A1 | 10/1998 |
| DE | 19717255 A1 | 10/1998 |
| DE | 20 2006 015 098 U1 | 11/2006 |
| EP | 1260754 | 11/2002 |
| EP | 1479477 | 11/2004 |
| JP | 01-240201 | 9/1989 |
| JP | 06-106438 | 4/1994 |
| JP | 08-118121 | 5/1996 |
| JP | 2006-326793 | 12/2006 |
| WO | 97/41997 | 11/1997 |
| WO | 03/072300 | 9/2003 |

OTHER PUBLICATIONS

WFL Millturn Technologies. The new M35 Millturn replaces the M30 Millturn WFL Company Website[online], 2005 [retrieved on Dec. 27, 2010]. Retrieved from the Internet:< URL: http://www.wfl.at/Company/Chronicle?sc_lang=en>.*

WFL Millturn Technologies. M35, M35-G WFL Company Website[online], 2010 [retrieved on Dec. 27, 2010]. Retrieved from the Internet:< URL: http://www.wfl.at/Products/Millturns/MillturnsM35M35G?sc_lang=en>.*

Yamazaki Mazak. Mill/turn centre reduces cycle times dramatically Manufacturingtalk.com Oct. 2005[Retrieved from Archive.org on Feb. 12, 2006]. Retrieved from the internet < URL: http://www.manufacturingtalk.com/news/yma/yma200.html.*

Cutting Edge Machine Tool Sales, Inc Mazak Integrex 300 IVS 2007 Retrieved from the Internet: [Retrieved on Jun. 15, 2011] < URL: http://www.cuttingedgemachinetools.com/cncl/1411.htm.*

European Search Report for corresponding Application No. 08405221.6 dated Nov. 20, 2008.

European Office Action for corresponding application No. 08405221.6 dated May 26, 2009.

Chinese Office Action for corresponding Chinese application No. 200810212864.4 dated Aug. 6, 2010 (English translation).

Chinese Office Action for corresponding Chinese application No. 200810212864.4 dated Nov. 13, 2009 (English translation).

* cited by examiner

COMPOSITE WORKING LATHE

The present application is based on and claims priority of Japanese patent application No. 2007-239696 filed on Sep. 14, 2007, the entire contents of which are hereby incorporated by reference.

BACKGROUND OF THE INVENTION

1. Field of the Invention

The present invention relates to composite working lathes, and more specifically, to composite working lathes having an improved arrangement of tool magazine unit devices.

2. Description of the Related Art

Composite working lathes are provided with tool magazines having stored therein a plurality of tools to be supplied to tool spindles for subjecting workpieces held to the spindle for various machining processes.

Japanese patent application laid-open publication No. 2006-326793 (patent document 1) discloses a typical tool magazine arrangement in which the tool magazine is arranged on the rear side of the lathe, and Japanese patent application laid-open publication No. 06-106438 (patent document 2) discloses a tool magazine arranged on the upper portion of a spindle stock.

Further, Japanese patent application laid-open publication No. 08-118121 (patent document 3) discloses an arrangement in which the tool magazine is arranged on the upper portion of a tool spindle.

SUMMARY OF THE INVENTION

The object of the present invention is to provide a composite working lathe capable of improving the workability and maintenance performance of tools by improving the structure of the tool magazine unit.

In order to achieve the above objects, the present invention provides a composite working lathe comprising a bed, a spindle arranged on the bed, a machine body having a tool spindle disposed facing the spindle, and a tool magazine unit storing a plurality of tools for providing tools to the tool spindle via an automatic tool changer, wherein the tool magazine unit is disposed in front of the spindle of the machine body.

Further, the present composite working lathe comprises a cover covering the machine body and a cover covering a tool magazine device of the tool magazine unit; and a door for allowing access to a machining portion provided on the cover covering the machine body, and a door and a window for allowing access to the tool magazine device provided on the cover covering the tool magazine device.

According further to the present composite working lathe, the window provided on the cover covering the tool magazine device is located at a position facing a tool to be supplied to the tool spindle in a subsequent step, and the door provided on the cover covering the tool magazine device is provided with a window for visual observation at a position facing a used tool having been returned to the tool magazine.

Moreover, the present composite working lathe further comprises a stillage or a magazine rack provided on the cover covering the tool magazine device, and a foot switch disposed on a lower end portion of the cover covering the tool magazine device.

As disclosed, the composite working lathe of the present invention has a tool magazine unit disposed in front of the spindle of the machine body, enabling the operator to monitor both the machining portion and the tool magazine.

Therefore, the operator can directly visually observe and confirm the tool to be supplied to the tool spindle in the subsequent step. Further, the maintenance performance of the composite working lathe can be improved since chips or the like attached to the used tool can be cleaned easily.

Moreover, a space for providing a stillage, a magazine rack or the like is newly created near the operator, by which the workability of the composite working lathe is improved.

DETAILED DESCRIPTION OF THE PREFERRED EMBODIMENTS

Now, the composite working lathe according to the present invention will be described with reference to the drawings.

Figure 1:
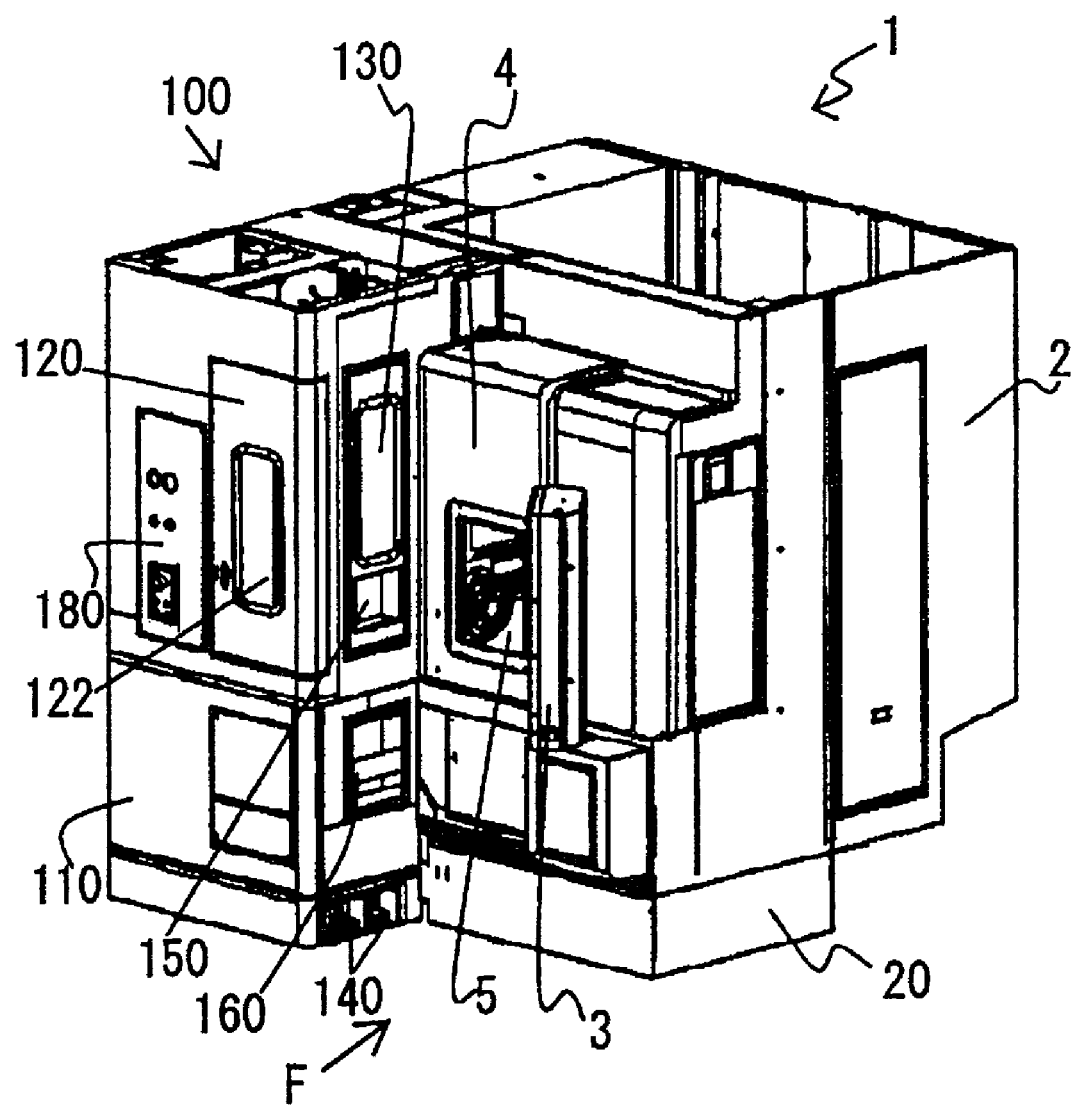
FIG. 1 is an external view showing the composite working lathe according to the present invention.
Figure 2:
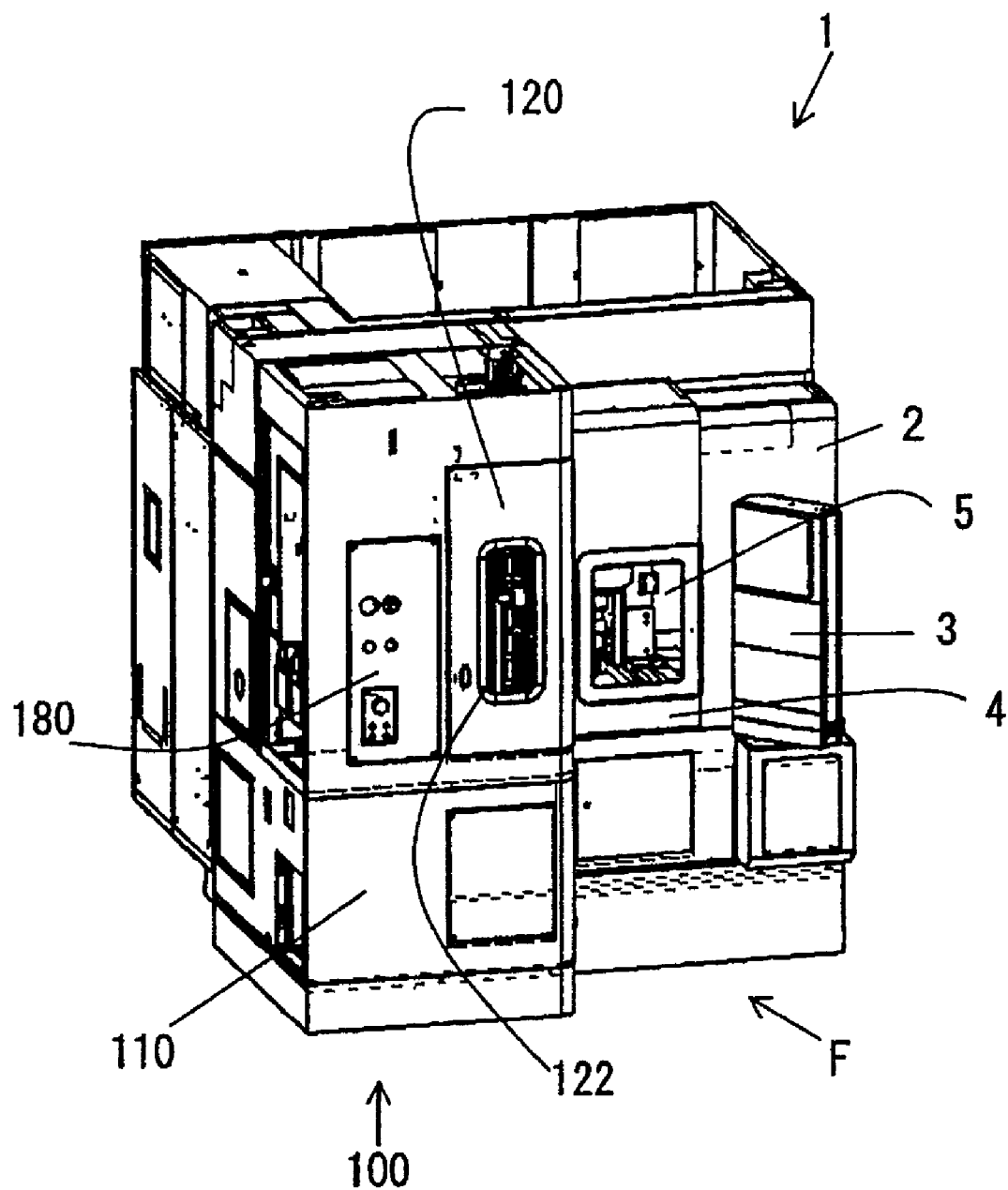
FIG. 2 is an external view showing the composite working lathe according to the present invention.
Figure 3:
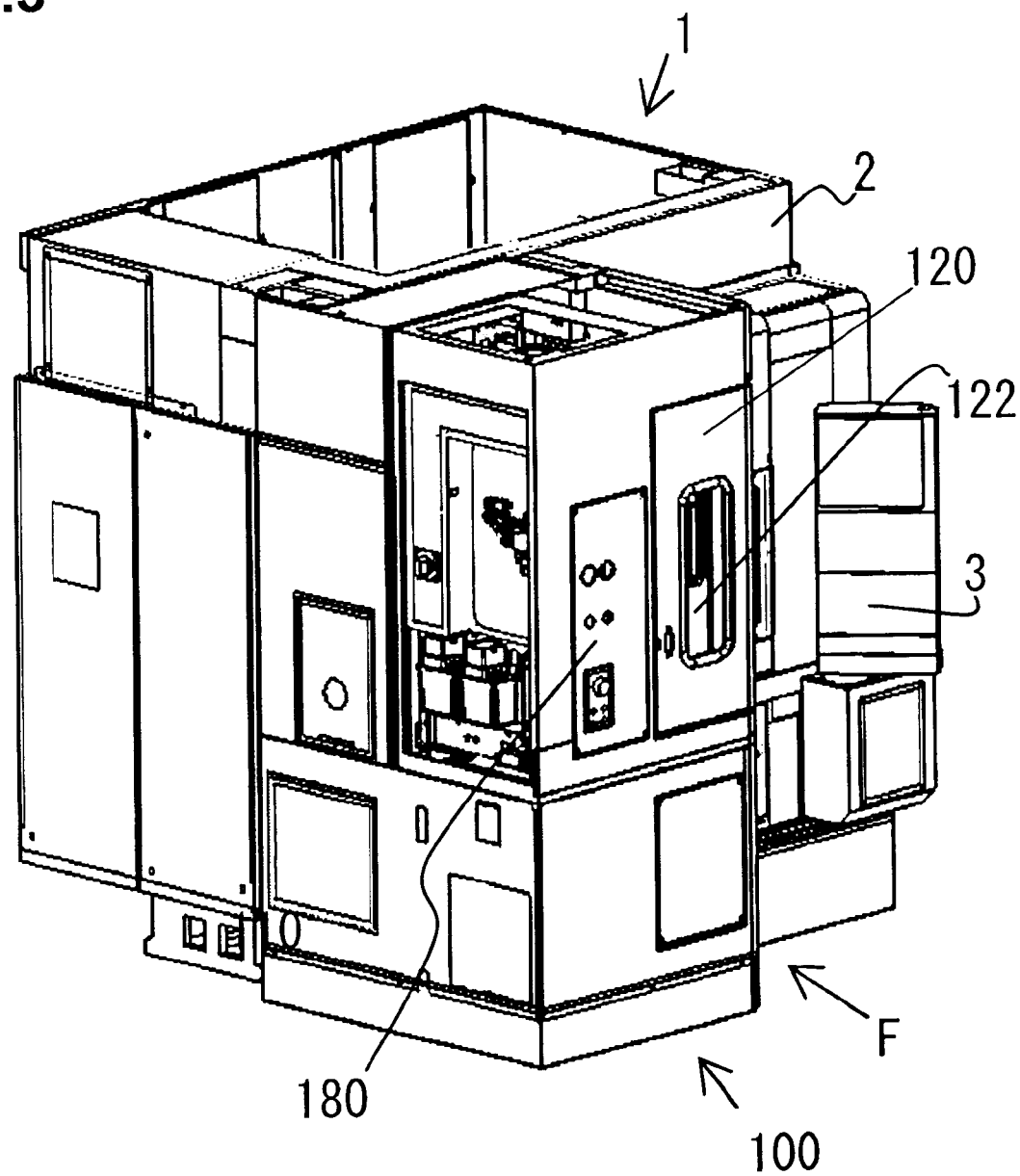
FIG. 3 is an external view showing the composite working lathe according to the present invention.

FIGS. 1 through 3 illustrate an external view of the composite working lathe of the present invention viewed from different directions.

Figure 4:
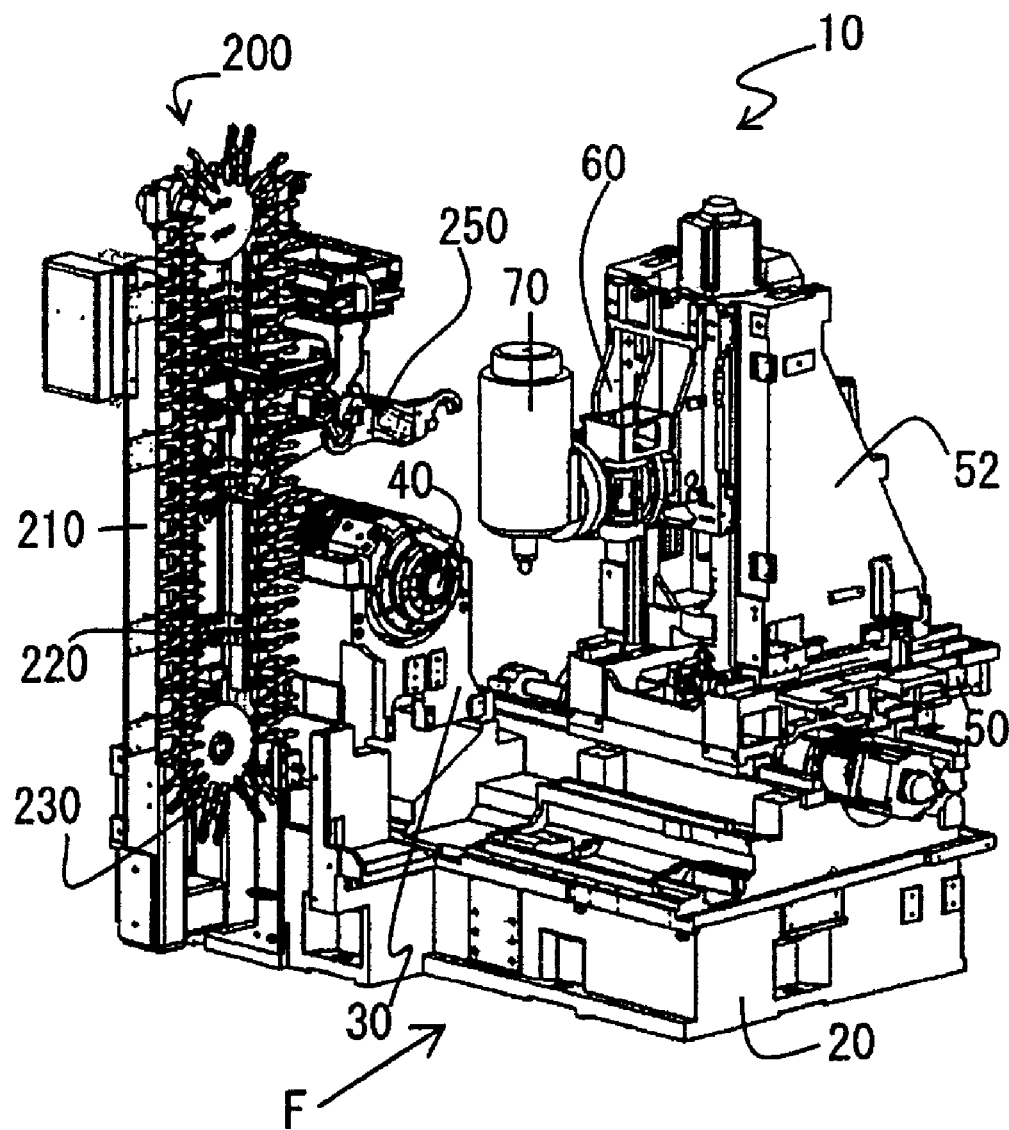
FIG. 4 is a structural drawing of the machine body of the composite working lathe according to the present invention.
Figure 5:
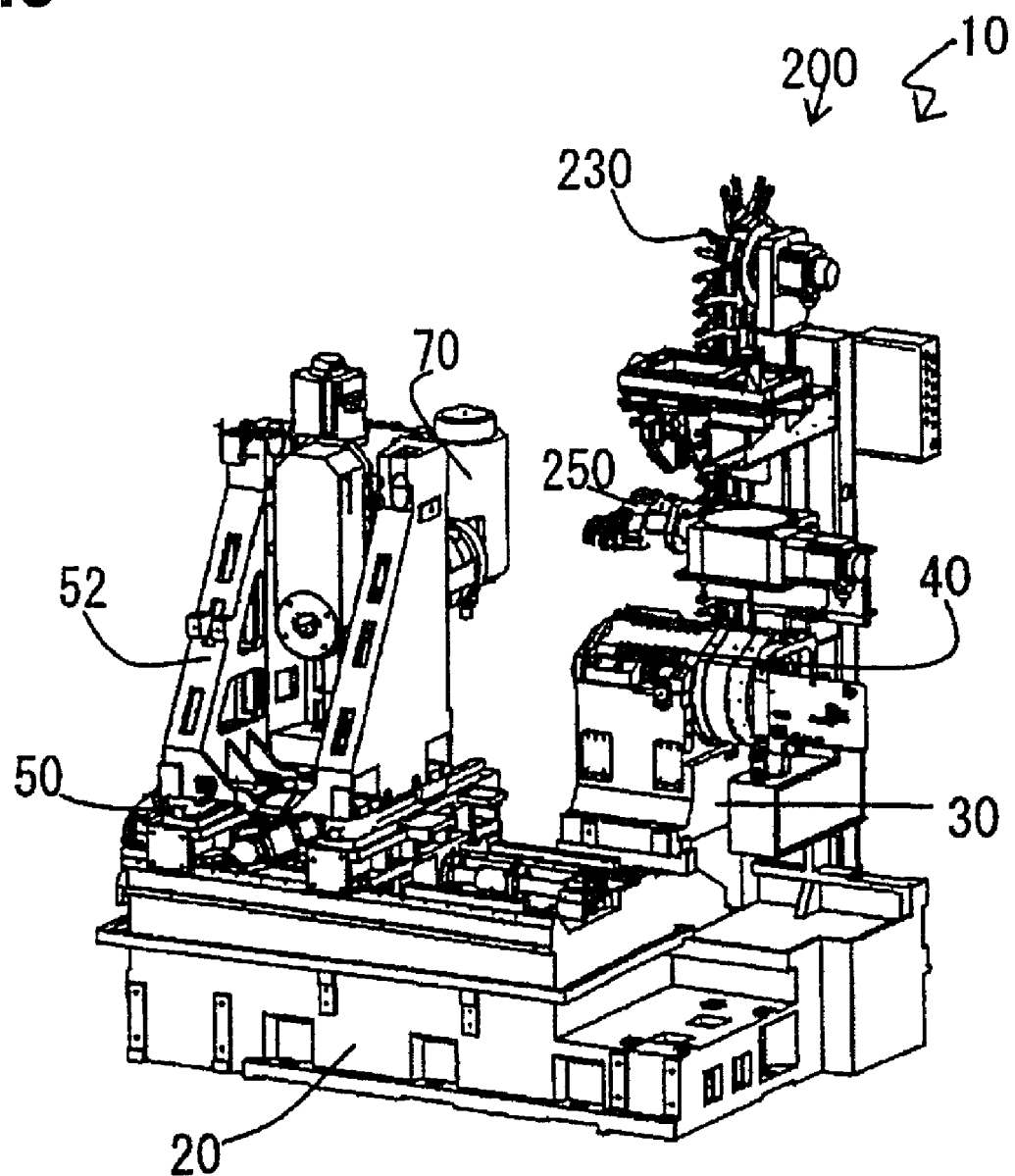
FIG. 5 is a structural drawing of the machine body of the composite working lathe according to the present invention.

FIGS. 4 and 5 illustrate the structure of the machine body of the composite working lathe.

In the drawings, reference letter F shows the front side of the composite working lathe.

The composite working lathe denoted as a whole by reference number 1 is arranged so that all the sides of the machine body 10 illustrated in FIGS. 4 and 5 are surrounded by a cover. In addition to a cover 2, an NC operating panel 3 and a door 4 which enables to access to the machining portion are provided. Door 4 is provided with a window 5 enabling operators to view the inner side of the cover.

As shown in FIGS. 4 and 5, the machine body 10 is equipped with a bed 20, a spindle stock 30 arranged on the bed 20, and a spindle 40 disposed on the spindle stock 30.

A slide base 50 disposed independently from the spindle stock 30 is slidably disposed on the bed 20, and on the slide base 50 is disposed a column 52 slidable in the direction orthogonal to a sliding axis of the slide base 50. A tool spindle stock 60 is disposed slidably in the up-down direction on the front side of the column 52, and a tool spindle 70 is rotatably disposed on the tool spindle stock 60. Various tools stored in a tool magazine are supplied in exchangeable manner to the tool spindle 70 via an automatic tool changer.

As illustrated in FIGS. 1 through 3, in the composite working lathe 1 according to the present invention, a tool magazine unit 100 is disposed on a front side of the main body of the machine. Actually, the tool magazine unit is disposed on the front side of the spindle stock of the machine body.

As shown in FIGS. 4 and 5, the main body 200 of the tool magazine unit is equipped with a device frame 210, a chain 220 disposed in the up-down direction with respect to the device frame 210, and a large number of grippers 230 attached to the chain. Each gripper 230 cooperates with an arm of the automatic tool changer 250 and supplies tools to the tool spindle 70 in an exchangeable manner.

As shown in FIGS. 1 through 3, the tool magazine unit 100 is equipped with a cover 110 for covering the main body 200. The cover 110 is provided with a door 120 capable of being opened and closed for allowing access to the main body 200 of the tool magazine unit.

The door 120 has a window 122. Materials such as hardened glass and resin are used as a transparent plate attached to the window.

For example, an electric panel 180 is provided adjacent to the door 120 on a cover 110 on the front side F of the composite working lathe 1 of the tool magazine unit 100.

A window 130 is provided on a cover of the tool magazine unit orthogonal to the door 4 allowing access to the machining portion of the composite working lathe 1. Materials such as hardened glass and resin are used as a transparent plate attached to the window. A stillage 150 is provided below the window 130, which can be used to temporarily store hand tools or the like by the operator of the composite working lathe.

Further, a magazine rack 160 is provided below the stillage 150, which can be used for storing instruction manuals or the like in an organized manner.

Further, a foot switch 140 is disposed below the magazine rack for opening and closing a chuck.

Figure 6:
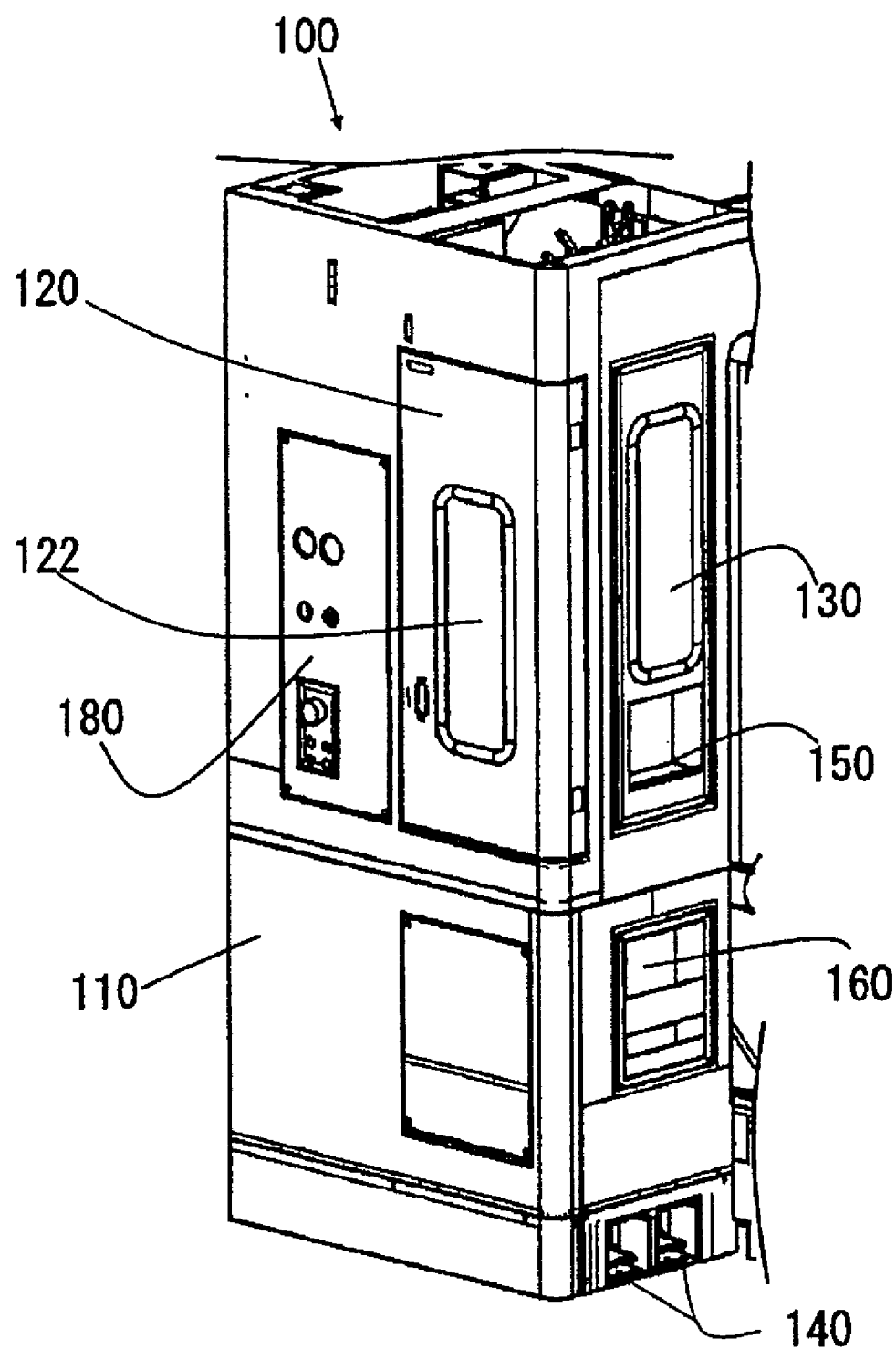
FIG. 6 is an overall view of the tool magazine unit of the present invention.
Figure 7:
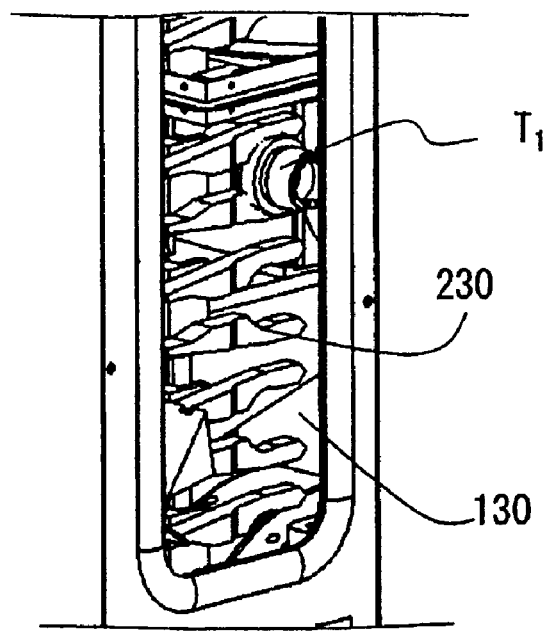
FIG. 7 is a partial diagram of the tool magazine unit of the present invention.
Figure 8:
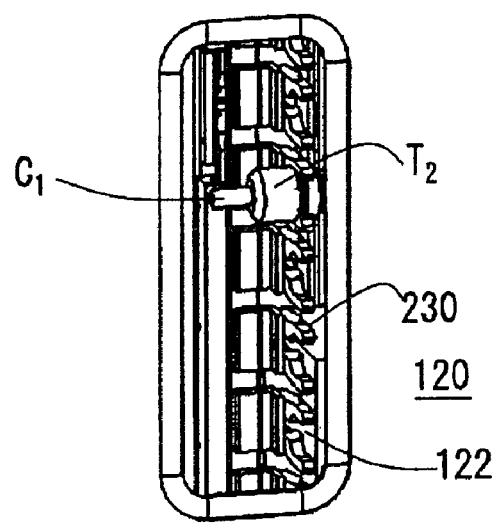
FIG. 8 is a partial diagram of the tool magazine unit of the present invention.

FIG. 6 illustrates in detail the whole body of the tool magazine unit 100, FIG. 7 illustrates in detail the window 130 disposed on a side wall orthogonal to the door 4 allowing access to the machining portion, and FIG. 8 illustrates in detail the door 120 disposed on a side wall arranged in parallel to the door 4 providing access to the machining portion.

As illustrated in FIG. 7, the operator can visually observe the next tool $T_1$ to be provided to the tool spindle through the window 130 formed on the side wall orthogonal to the door 4 allowing access to the machining portion.

The operator can visually confirm that this tool $T_1$ is a proper tool, and therefore, it becomes possible to prevent occurrence of improper processing and other failures.

As illustrated in FIG. 8, the operator can visually observe the status of the used tool $T_2$ through the window 122 on the door 120 disposed on a side wall arranged in parallel to the door 4 providing access to the machining portion.

If chips $C_1$ or the like are attached to the tool $T_2$, the operator can simply open the door 120 and clean the tool $T_2$.

As described, the composite working lathe according to the present invention is arranged so that the tool magazine unit is disposed in front of the spindle of the machine body, so that the operator can visually monitor both the machining portion and the tool magazine.

According to the present arrangement, the operator can directly visually observe and confirm the tool to be provided to the tool spindle in the subsequent step. Further, the chips or the like attached to the used tool can be cleaned easily, by which the maintenance property can be improved.

Furthermore, a space for providing a stillage and a magazine rack is newly created adjacent to the operator, by which the working property of the lathe can be improved.

What is claimed is:

1. A composite working lathe comprising:
   a bed;
   a workpiece spindle arranged on the bed;
   a machine body having a tool spindle disposed facing the workpiece spindle;
   a tool magazine unit storing a plurality of tools for providing the tools to the tool spindle via an automatic tool changer, wherein the tool magazine unit is disposed in front of the workpiece spindle such that the machine body and the tool magazine unit are located on opposite lateral sides of a rotation axis of the workpiece spindle;
   a first cover covering the machine body and a second cover covering a tool magazine device main body of the tool magazine unit; and
   a first door for allowing access to a machining portion of the composite working lathe, the first door being provided on the first cover covering the machine body, and
   a second door and a first window for allowing access to the tool magazine device main body, the second door and first window being provided on the second cover covering the tool magazine device main body;
   wherein the tool magazine unit comprises a chain disposed with a longitudinal axis thereof extending in the up-down direction, which chain moves in a plane orthogonal to the rotation axis of the workpiece spindle,
   the first window provided on the second cover covering the tool magazine device main body is located at a position facing a next tool to be supplied to the tool spindle from the tool magazine unit in a subsequent step, and
   the second door provided on the second cover covering the tool magazine device main body is provided with a second window for visual observation at a position facing a used tool returned to the tool magazine unit, a major plane of the second window being orthogonal to a major plane of the first window, the first window being located between the workpiece spindle and the second window.

2. The composite working lathe according to claim 1, further comprising a stillage provided on the second cover covering the tool magazine device main body.

3. The composite working lathe according to claim 1, further comprising a magazine rack provided on the second cover covering the tool magazine device main body.

4. The composite working lathe according to claim 1, further comprising a foot switch disposed on a lower end portion of the second cover covering the tool magazine device main body.

5. The composite working lathe according to claim 1, wherein the second door and the second window are provided adjacent to the first door of the machine first cover.

6. The composite working lathe according to claim 1, wherein the tool magazine unit is disposed between the workpiece spindle and the second window.

* * * * *